United States Patent [19]

Mengelt et al.

[11] Patent Number: 5,670,833

[45] Date of Patent: Sep. 23, 1997

[54] POWER TRANSFER METHOD AND APPARATUS FOR UNINTERRUPTIBLE POWER SYSTEMS

[75] Inventors: Kevin R. Mengelt, Port Edwards; Mark L. Schultz, Wisconsin Rapids, both of Wis.

[73] Assignee: General Signal Power Systems, Inc., Waukesha, Wis.

[21] Appl. No.: 344,286

[22] Filed: Nov. 23, 1994

[51] Int. Cl.⁶ ............................................. H02J 7/00
[52] U.S. Cl. ............................ 307/66; 307/64; 307/87; 364/492
[58] Field of Search ................... 307/64, 65, 66, 307/85, 86, 87; 364/492, 480, 273, 273.1, 273.2, 273.3, 273.4, 273.5, 948.4, 948.5, 948.91

[56] References Cited

U.S. PATENT DOCUMENTS

| | | | |
|---|---|---|---|
| 4,692,854 | 9/1987 | Baxter, Jr. et al. | 363/75 |
| 4,916,329 | 4/1990 | Dang et al. | 307/66 |
| 4,956,563 | 9/1990 | Schornack | 307/66 |
| 5,182,518 | 1/1993 | Stich et al. | 324/511 |
| 5,229,651 | 7/1993 | Baxter, Jr. et al. | 307/66 |
| 5,264,732 | 11/1993 | Fiorina et al. | 307/66 |
| 5,483,463 | 1/1996 | Qin et al. | 364/492 |
| 5,532,523 | 7/1996 | Tang | 307/64 |

*Primary Examiner*—William M. Shoop, Jr.
*Assistant Examiner*—Jonathan S. Kaplan
*Attorney, Agent, or Firm*—Foley & Lardner

[57] ABSTRACT

An uninterruptible power system having a main power path between input and output terminals monitors the phase of the voltages at the input and output terminals while power is applied to the input terminals from an AC power source. The phase difference between the voltages at the input and output terminals is determined and, upon occurrence of a fault in the power supplied to the input terminals, an inverter is turned on to provide power to the load at a frequency which matches the frequency of the input voltage before the fault and at a phase which is the phase of the voltage at the input terminals before the fault corrected in accordance with the phase difference determined before the fault. Prior to transfer of the supply of power back to the main AC power source when the fault ends, the phase and frequency of the voltage at the input terminals is again measured. The frequency of the voltage from the inverter is adjusted to match that of the voltage at the input terminals, while the phase is adjusted to the phase of the input voltage corrected by a selected phase difference. The selected phase difference may be the last phase difference determined before occurrence of the fault, or a phase difference which is corrected based on the current drawn by the load where the phase shift between the input and output terminals in the uninterruptible power system changes as a function of load current.

12 Claims, 4 Drawing Sheets

POWER TRANSFER METHOD AND APPARATUS FOR UNINTERRUPTIBLE POWER SYSTEMS

FIELD OF THE INVENTION

This invention pertains generally to the field of electrical power systems and particularly to uninterruptible power supplies or systems, and the operation and monitoring of such systems.

BACKGROUND OF THE INVENTION

Uninterruptible power supplies or systems (commonly referred to as "UPS") are used to provide backup power to critical loads such as computers where a loss of line power can result in the interruption of programs and the loss of valuable data. Uninterruptible power supplies may also provide a line power conditioning function to ensure that transient spikes, low voltage conditions, or distorted power waveforms on the AC power system do not disturb the operation of the computer or other critical load which is supplied with power through the UPS. Typically, the UPS includes a battery which is interfaced through an inverter to the AC output lines. When a fault occurs in the input AC power, the inverter is controlled to provide power from the battery to the AC output lines at the same frequency and with substantially the same waveform as the normal input AC power.

A UPS typically includes input terminals which may be connected to the AC power system (e.g., commercial utility power) for receiving, for example, 60 Hz, 110 volt AC power. The UPS supplies AC power at its output terminals to the critical load derived from either the AC power received at the input terminals or from power supplied from the battery through the inverter. Many types of UPS provide a main power supply path from the input terminals to the output terminals to normally supply power from the AC power system to the critical load, and typically in such systems the inverter is not running constantly. The UPS monitors the input AC power and when a line fault or other failure of the line power is detected, the UPS opens the main power path to isolate the input terminals from the load, and turns on the inverter to supply AC power from the inverter to the load. In such UPS, the main power path may include circuit elements which affect the phase of the power between the input and output terminals. These circuit elements can include linear or ferroresonant transformers, series inductors, filter capacitors, or combinations of reactive elements used, for example, as filters to reject electromagnetic interference. The presence of these circuit elements in the main power path from the input terminals to the output terminals introduces a phase shift between the voltage received at the input terminals and the voltage supplied at the output terminals. Moreover, the magnitude of the phase shift may depend upon the power drawn by the critical load which is supplied by the UPS, which can vary over time.

When a fault occurs in the input AC power and the inverter is controlled to provide power from the battery, distortion in the output voltage waveform may result from a lack of synchronization between the phase of the inverter output waveform and the phase of the output voltage waveform before the fault occurred. Even if the output voltage of the inverter is phase locked to the AC voltage at the input terminals prior to the fault, which is the case for many prior UPS, the voltage from the inverter may not be in phase with the pre-fault voltage at the output terminals because of the circuit components in the main power path. In some cases, the distortion caused by lack of phase synchronization may be sufficient to shut down critical loads which are supplied by the UPS. When the fault in the input AC power no longer exists, similar distortion may occur in the output voltage waveform when supply of power to the load is transferred back to the AC power system from the inverter.

SUMMARY OF THE INVENTION

In accordance with the present invention, an uninterruptible power system (UPS) is controlled to provide a smooth and distortion free transfer of the supply of power to a critical load upon occurrence of a fault in the power from the main AC power source. The transfer is accomplished such that the phase of the voltage from the inverter of the UPS is synchronized to the phase of the voltage which had been provided to the output terminals from the AC power source before the occurrence of a fault. Similarly, upon transfer of the supply of power back to the main AC power source through the main power path from the input terminals to the output terminals, the inverter is controlled to provide AC output voltage at a frequency and phase which is synchronized to the frequency and phase that will appear at the output terminals when AC power is resupplied through the main power path. The uninterruptible power system preferably synchronizes the power provided from the inverter and the power provided through the main power path despite changes in the power drawn by the load connected to the output terminals.

The uninterruptible power system of the present invention has a main power path extending from the input terminals to the output terminals with a power transfer device in the main power path which affects the phase of the voltage between the input and output terminals. The inverter is connected to provide power from an auxiliary power source, such as a battery, to the output terminals when the main AC power system has failed. The UPS of the invention monitors the AC voltage at the input terminals to determine when a fault occurs, and, upon occurrence of a fault, opens a switch in the main power path to isolate the input terminals from the output terminals and turns on the inverter to supply power to the output terminals from the auxiliary power source. The controller further measures the frequency and the phase of the AC voltage applied to the input terminals from the main AC power source, and measures the phase of the output voltage provided to the output terminals during normal supply of power through the main power path. Because of the presence of the power transfer device, the phases of the voltages at the input and output terminals will not necessary be the same, and the controller determines the phase difference between the two. In addition, the controller preferably measures the phase difference at various levels of output current drawn by a load and stores in a memory the phase difference as a function of the output load current.

Upon occurrence of a fault, the controller controls the switching of the inverter to provide output power at a phase which is corrected from the measured phase at the input terminals before the fault in accordance with the phase difference determined at a time before the fault. Consequently, when the power through the main power path is interrupted, and the inverter supplies the AC power to the load, there will be substantially no difference in phase between the voltage supplied to the load before and after the fault.

When the fault has ended in the main AC power source, and AC power is available once again at the input terminals, it is desirable that the UPS return the supply of power to the load back to the main AC power source. The controller in the UPS measures the frequency and phase of the AC input voltage, and, prior to switching the inverter off, corrects the frequency of the output voltage so that it matches the frequency of the voltage supplied to the input terminals. However, the controller further changes the phase of the output voltage, not to match the phase of the input voltage, but rather to be at a phase which is the phase of the input voltage corrected by a selected phase difference. The selected phase difference can be, for example, the phase difference which was found at the time just before the fault, or the selected phase difference can be that which has been measured at various levels of output current and stored in memory. The controller may measure the output current being drawn by the load and determine from the data in memory the appropriate phase difference at that level of output current. This phase difference is then used to compensate the phase of the output voltage as supplied by the inverter from the phase of the input voltage. Alternatively, the appropriate phase difference may be determined using a formula based on load to estimate the phase correction required. The appropriate correction formula will depend on the circuit topology of the UPS. When the phase and frequency of the inverter have been corrected in this manner, the UPS then switches off the inverter and closes the switch in the main power path to supply power from the input terminals directly to the output terminals through the power transfer device. The phase of the voltage at the output terminals will now be substantially identical to that which had been provided by the UPS during inverter operation so that substantially no disruption of the voltage waveform applied to the load occurs.

The determination of the phase correction may be carried out in a microprocessor which stores the corrected phase difference information in memory. The frequency and phase of the input voltage is preferably determined using a phase-locked loop, which can be formed either in hardware or can be implemented in software in the microprocessor. The microprocessor preferably stores the phase difference corrections as a function of load current in a non-volatile memory so that it will be available when needed. In this manner, the UPS of the invention is capable of adapting to different load conditions.

The present invention may be implemented in various types of UPS which have a power transfer device, such as a ferroresonant transformer, in the main power path. These further include UPS which have a linear transformer in the main power path, as well as those in which the main power path includes various reactive devices primarily used for filtering purposes.

Further objects, features and advantages of the invention will be apparent from the following detailed description when taken in conjunction with the accompanying drawings.

DETAILED DESCRIPTION OF THE INVENTION

Figure 1:
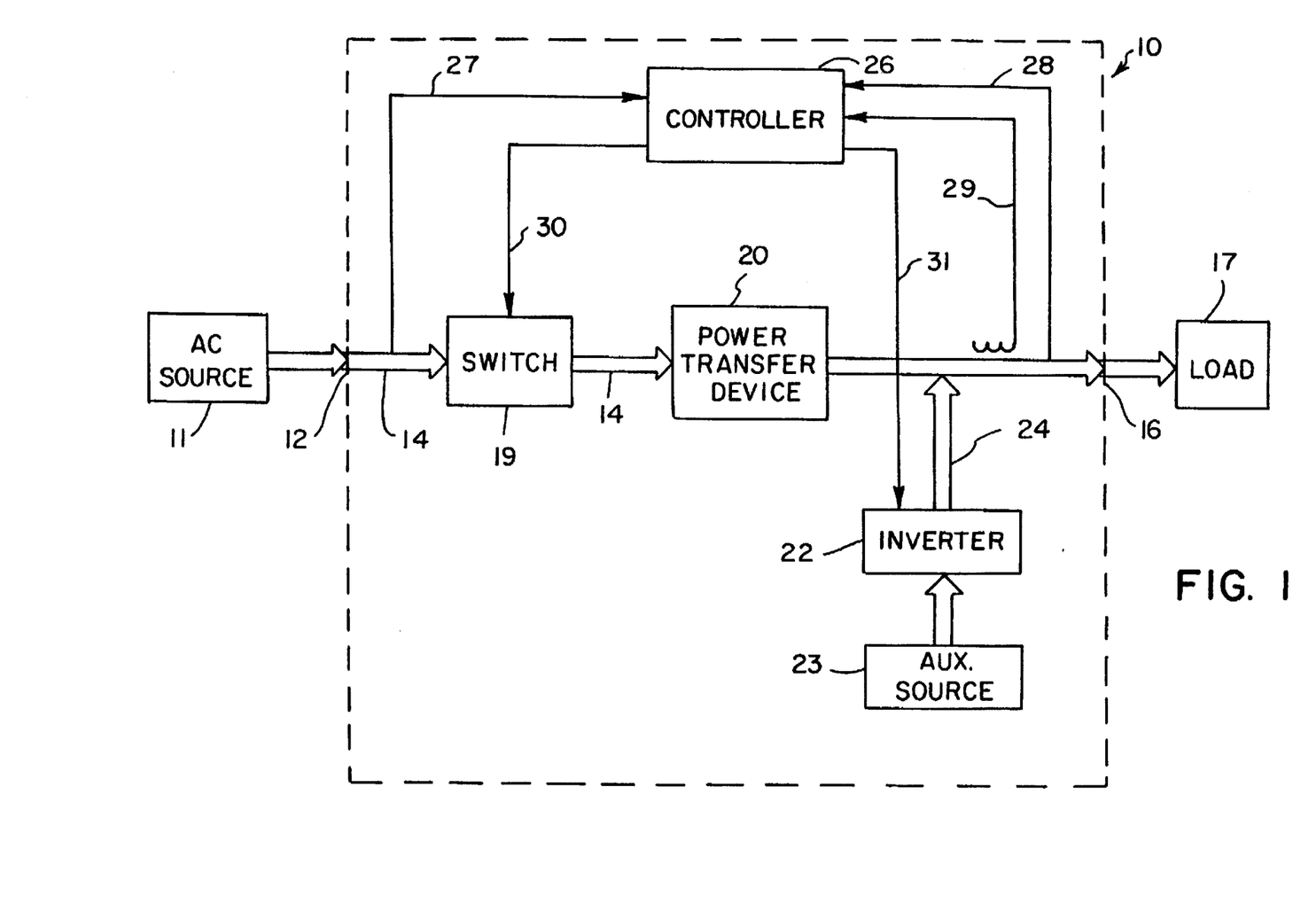
FIG. 1 is a simplified block diagram of an uninterruptible power system incorporating the present invention.

With reference to the drawings, a schematic diagram of an uninterruptible power system illustrating the concepts of the present invention is shown in block diagram form within the dashed lines labeled 10 in FIG. 1. The system 10 of FIG. 1 receives AC power from a main AC power source 11, such as commercial utility power lines, which is connected to input terminals 12. The power on the input terminals 12 passes through a main power path 14 to output terminals 16 during normal operation to supply power to a load 17. A controllable switch 19, which may be a static switch such as thyristors, triacs, insulated gate bipolar transistors (IGBT), or mechanical relays, etc., is connected in the main power path to allow selective interruption of power through the path 14 to isolate the input terminals 12 from the output terminals 16 when necessary.

A power transfer device 20 is also connected in the main power path 14 between the input terminals 12 and the output terminals 16, either before or after the switch 19 (or, the device may have components connected both before and after the switch 19). The power transfer device 20 is shown schematically as a block in FIG. 1 to represent any of various circuit components which can shift the phase of the voltage appearing at the output terminals 16 from the phase of the voltage at the input terminals 12. Such devices can include transformers, both ferroresonant and linear, and reactive components used for various filtering purposes—for example, to reduce electromagnetic interference (EMI)—, for surge protection, and for other purposes. As is conventional, the uninterruptible power system (UPS) 10 also includes an inverter 22 receiving power from an auxiliary source 23, typically a battery which supplies a DC voltage to the inverter 22. The inverter 22 provides AC output power on lines 24 to the main power path 14 when the inverter is switched on at a point typically between the power transfer device 20 and the output terminals 16, but may also supply power through the power transfer device 20.

A controller 26 is connected to the main power path 14 at or near the input terminals 12 by connecting lines 27 to monitor the voltage at the input terminals, and similarly the controller 26 is connected by lines 28 to the main power path at or near the output terminals 16 to monitor the voltage at the output terminals. The controller 26 also preferably is connected by a line or lines 29 to measure the output current provided to the load 17. The controller utilizes the information sensed at the input terminals 12 to determine when a fault occurs in the power provided from the main AC power source 11. When a fault occurs, the controller 26 provides a signal on a line 30 to the switch 19 to open the switch 19, interrupting the supply of power through the main power path 14 from the input terminals to the output terminals. The controller also provides control signals on lines 31 to the inverter 22 to control the inverter to provide AC output power to the output terminals 16 when the switch 19 has interrupted the supply of power from the input terminals 12.

Figure 2:
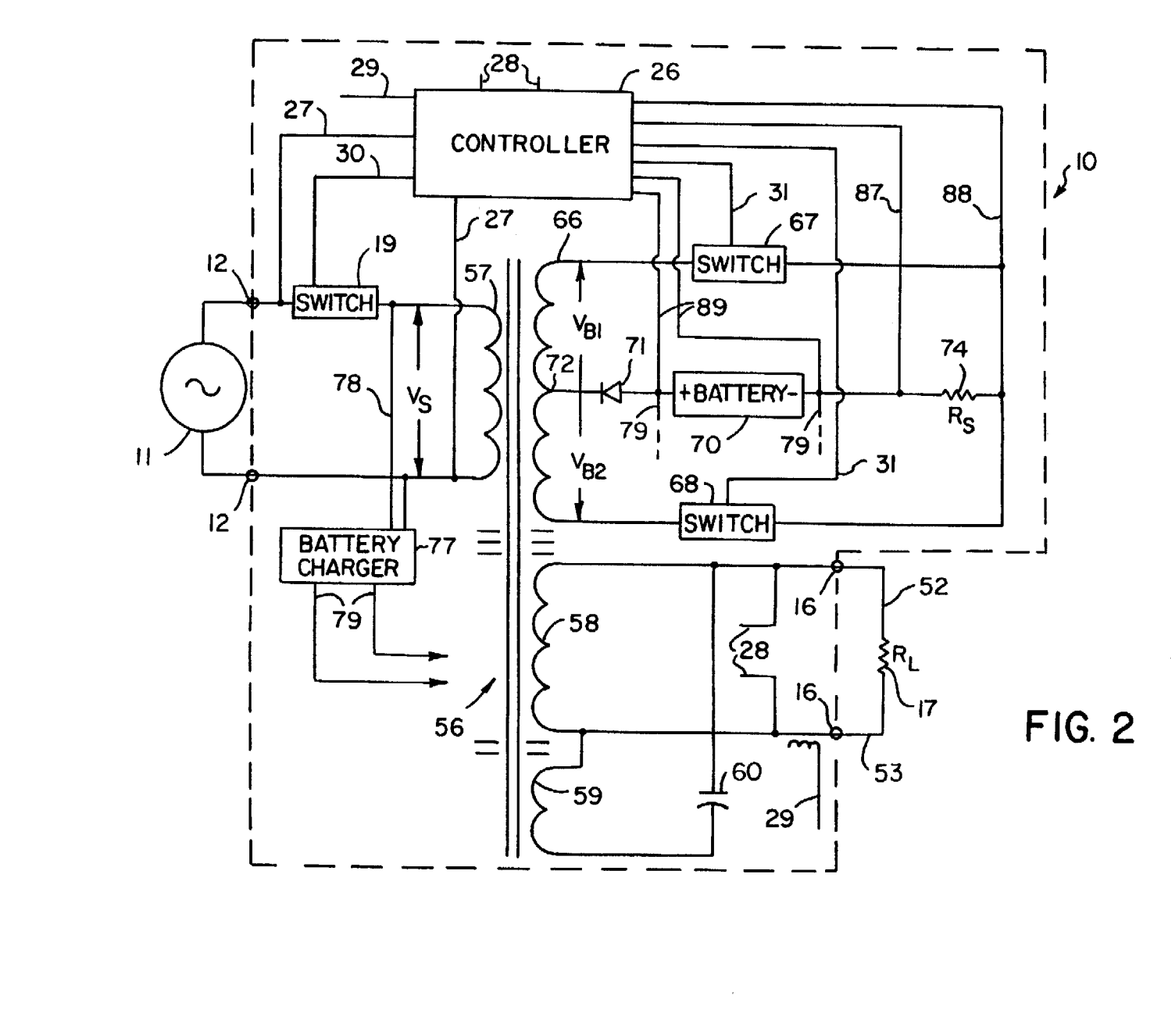
FIG. 2 is a schematic circuit diagram of an exemplary uninterruptible power system utilizing a ferroresonant transformer which incorporates the present invention.

As noted above, the power transfer device 20 can be any of many circuit components which can affect the phase of the power provided between the input terminals 12 and the output terminals 16. To help exemplify the invention, a schematic for one type of uninterruptible power system which has such a power transfer device, a ferroresonant transformer, is shown in FIG. 2. The operation of such an uninterruptible power system is described in U.S. Pat. No. 5,182,518 to Stich, et al., the disclosure of which is incorporated herein by reference.

The exemplary UPS 10 of FIG. 2 includes a ferroresonant transformer 56 which has a primary 57 connected to the AC power source 11, secondaries 58 and 59 across which a capacitor 60 is connected, with these secondaries connected to the load 17, and an auxiliary primary 66 to which the inverter of the UPS is connected. The inverter is comprised of switching elements 67 and 68 which are connected to the two ends of the primary 66, and an auxiliary power source battery 70 which may be connected, for example, through a diode 71 to a center tap 72 of the auxiliary primary 66. The battery current $I_b$ in the inverter is returned through a low resistance shunt 74. The blocking diode 71 prevents uncontrollable charging of the battery 70 from the transformer 56, although charging may also be controlled satisfactorily by suitable selection of the transformer turns ratio. The switches 67 and 68 may be any of various types of power switching devices such as bipolar transistors, MOSFETs, thyristors, MOS controlled thyristors (MCT), IGBTs, and the like. The switches 67 and 68 have gate lines 31 to which a gating signal can be applied to turn the switches 67 and 68 on and preferably also to turn the switches off. Although the switches 67 and 68 have been shown as being controlled at their gate lines for both turn-on and turn-off, it is apparent to those of ordinary skill that switching devices such as thyristors (SCRs) may be used by incorporating appropriate commutation means well known in the art. The battery 70 is charged by a battery charger 77 which receives AC power from the AC source 11 on input lines 78, and provides DC charging current to the battery on output lines 79.

The controller 26 supplies control signals on the lines 31 to control the switching of the switches 67 and 68. Further, the controller provides a control signal on the line 30 to the AC switch 19, connected in an input line from the power source 11, to control the application of power from the source 11 to the transformer primary 57. The voltage $V_s$ across the input terminals 12 is monitored by the controller through the lines 27. The controller 26 also receives the voltage across the shunt 74 from lines 87 and 88, which are connected to the opposite sides of the shunt 74, and from lines 89 connected across the battery 70 to monitor battery voltage. The voltage between the lines 87 and 88 will be proportional to the current $I_b$ flowing through the shunt 74 and the battery 70. The resistance $R_S$ of the shunt 74 is preferably relatively small and precisely known so that the current through the shunt can be determined accurately. As is typical for ferroresonant transformers, the winding 58 acts as the output or secondary winding, providing power to the load 17, with the winding 59 acting as a harmonic compensating winding and forming a tank circuit with the capacitor 60. Such ferroresonant transformers are well known in the art and are commonly utilized to provide compensation for harmonic distortion.

When power fails from the AC power system 11, the controller 26 causes the switch 19 to be opened, to disconnect the primary 57 from the power source 11, and operates the switches 67 and 68 to provide an alternating current across the auxiliary primary winding 66 to supply an AC output voltage at the output winding 58 of the ferroresonant transformer. Techniques for determining when line failure occurs are well known in the art, and an exemplary preferred method and system is shown in U.S. Pat. No. 5,229,651 for Method and Apparatus for Line Power Monitoring for Uninterruptible Power Supplies, incorporated herein by reference. Various constructions may be used for the inverter, such as that described in U.S. Pat. No. 4,692,854, incorporated by reference.

During normal operation when the AC power source 11 is providing AC power, the inverter is off and the AC power from the source is supplied through the ferroresonant transformer 56 to the load 17. Primarily because of the ferroresonant transformer 56, but also because of conventional elements not shown in FIG. 2 such as EMI filters and surge protection elements, the output voltage at the output terminals 16 will not be precisely in phase with the input voltage at the input terminals 12. Consequently, when a fault occurs in the supply of power from the source 11 and the switch 19 is opened, if the inverter is turned on to provide voltage at the same frequency and phase as the voltage detected across the input terminals 12, the voltage at the output terminals 16 may not match in phase the voltage before the fault. The controller 26 in the present invention utilizes the measured voltages at the input terminals 12 and the output terminals 16 before the fault to determine the phase shift that occurs through the main power path, and uses this information to properly operate the inverter so that it provides a transition from the main source power to auxiliary power without an abrupt change in phase.

Figure 3:
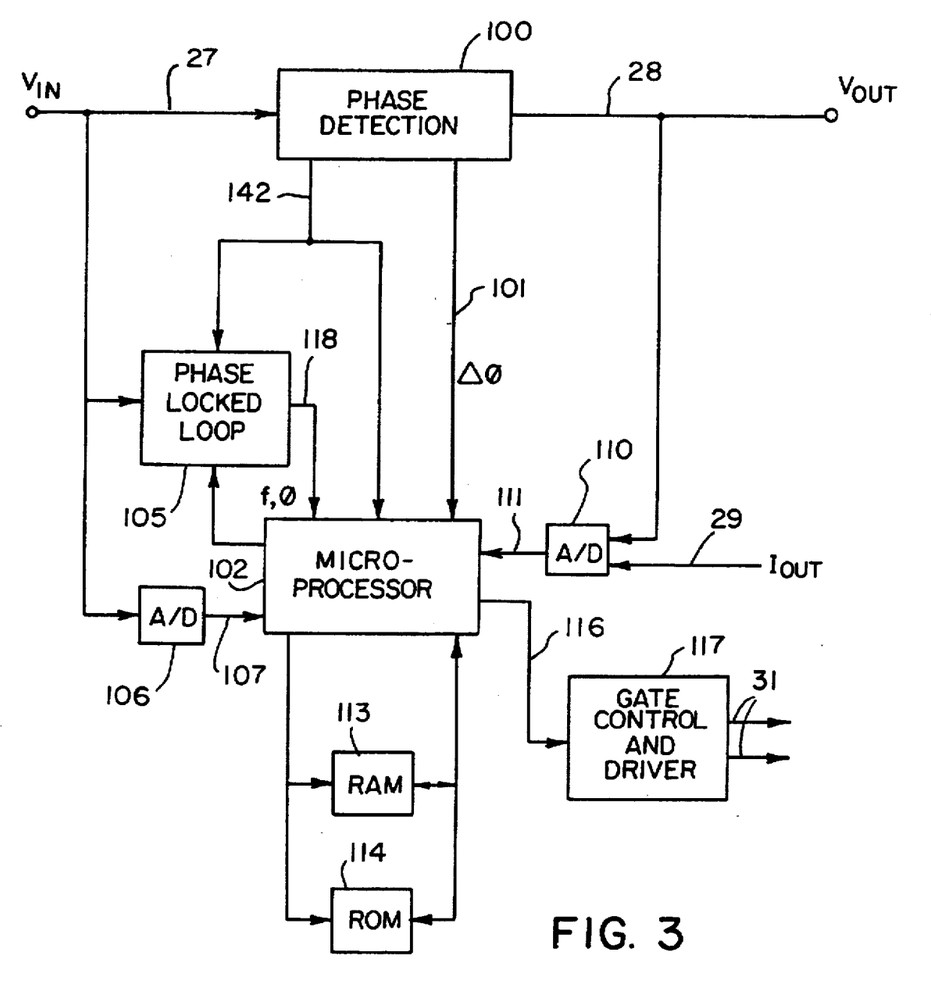
FIG. 3 is a simplified block diagram of the controller for an uninterruptible power system in accordance with the invention.

An exemplary simplified block diagram of the controller of the present invention is shown in FIG. 3. The input voltage on the lines 27 and the output voltage on the lines 28 (the input and output voltages may be referenced to a common line or ground) are provided to a phase detection circuit 100 which puts out a signal on a line 101 to a microprocessor 102. The signal on the line 101 is indicative of the phase difference between the voltages on the lines 27 and 28. The voltage on the lines 27 is also provided to a phase locked loop 105 connected by a line 118 to the microprocessor 102, or implemented by the microprocessor, and the input voltage $V_{in}$ is provided to an analog-to-digital converter 106 which provides digital data on data lines 107 to the microprocessor. The output voltage $V_{out}$ on the lines 28 is also provided to an analog-to-digital converter 110 which provides output data on data lines 111 to the microprocessor. A suitable microprocessor is a Mitsubishi 37702 microcontroller, a Siemens 80C166, or equivalent. Random access memory (RAM) 113 and read only memory (ROM) 114 are connected to the microprocessor 102 in a conventional fashion by data and address lines. The microprocessor also provides control signals on output lines 116 to a conventional gate control and driver circuit 117 which provides the output drive signals on the lines 31 to the inverter switches 67 and 68. The phase locked loop 105 may be formed in any desired and conventional manner, for example, utilizing a separate hardware phase locked loop or implementing the loop digitally in software within the microprocessor 102, for example, as described in U.S. patent application Ser. No. 08/161,338 entitled Method and Apparatus for Efficient Phase and Frequency Coherence Locking Optimized for Digital Systems, now U.S. Pat. No. 5,493,533, the disclosure of which is incorporated herein by reference. The phase locked loop 105 provides a continuously running analog or digital signal on a line 118 which matches in frequency and phase the fundamental component (e.g., at 60 Hz) of the input voltage $V_{in}$ at the input terminals 12. Consequently, when the power from the main power source fails, the phase locked loop 105 will continue to provide signals at the phase and frequency of the input voltage which can be used by the microprocessor 102, operating through the gate control and driver circuit 117, to control the switching of the switching devices in the inverter.

The output of the phase detection circuit 100 on the line 101 is used by the microprocessor 102 to correct the phase of the AC output voltage provided from the inverter. The microprocessor stores the phase difference information on the line 101 from the phase detection circuit, for example, in the RAM 113, for use at any time when a fault is detected and the UPS must switch to supply power from the inverter to the load. For example, the microprocessor may update the phase difference at every cycle of the input voltage and write the latest value of phase difference in memory over the previous value. To control the inverter to provide voltage at the proper phase, the microprocessor uses the phase difference in terms of a time delay $\Delta\phi$ ($\Delta\phi$ may be positive or negative) to provide signals on the output lines 116 and control signals to the inverter on the gate lines 31 which will control the switching of the inverter at both a proper frequency and proper phase which is synchronized to the phase and frequency of the voltage provided to the load before the fault. For the inverter shown in FIG. 2, the switches 67 and 68 are preferably gated on at a point in time equal to ½$\Delta\phi$ after the zero crossings of the signal provided by the phase locked loop 105 and are gated off in the manner described in patent Nos. 4,692,854 and 5,182,518. It has been found that switching of the inverter switches 67 and 68 in this manner (providing a rectangular waveform voltage across the halves of the winding 66) results in a substantially sinusoidal output waveform from the secondary 58 of the ferroresonant transformer 56 which will be at the proper phase to match the waveform of the power previously provided from the power source 11.

When power is again available from the main power source 11, so that the supply of power through the inverter from the battery can be discontinued, the phase locked loop 105 can lock to the voltage from the source 11 to provide information to the microprocessor 102 on the frequency f and phase $\phi$ of the input voltage at that time. The switching frequency of the inverter, under the control of the microprocessor, can be changed to match the frequency determined by the phase locked loop. However, because the output voltage is being provided from the inverter, a proper value for the input/output phase difference (time delay) $\Delta\phi$ is not available from the phase detection circuit. One way to estimate this phase difference in accordance with the present invention is the use by the microprocessor of the last phase difference, $\Delta\phi_o$, determined prior to the fault, to be used as a correction to the phase of the input voltage determined by the phase locked loop. The output voltage is then synchronized to this phase corrected input voltage waveform to help minimize distortion of the output voltage waveform when the inverter 22 is turned off and power is again supplied through the main power path 14 from the input terminals 12 to the output terminals 16. This phase correction generally yields acceptable results.

If the load 17 makes a highly variable constant power demand, the output current drawn by the load may vary significantly over time. A change in the output current when power is being supplied through the main power path may have the effect of changing the phase difference between the voltages at the input and the output terminals because of the effect of the power transfer device 20. Thus, if the output current during the time that the UPS 10 is providing power from the inverter to the load differs from the current that had been drawn by the load just before the fault, the phase difference between the input and output voltages at the time just before the fault may not be the correct phase difference required to minimize distortions of the output voltage waveform when the supply of power is transferred back to the main power source. The change in the phase difference as a function of output current can be determined experimentally for any particular UPS. Consequently, the phase differences which are seen at various levels of output current can be measured to generate a set of data which shows the phase difference $\Delta\phi$ as a function of output current. A formula can then be used to fit these data. The function data can be alternatively programmed in the ROM 114 as a look-up table which is available to the microprocessor 102. The microprocessor 102 then accesses the look-up table in ROM 114 before switch-over to provide the desired value of phase difference (time delay) $\Delta\phi$ based on the level of output current as monitored on the line 29 (which is supplied to the microprocessor through the analog-to-digital convertor 110). In this manner, before the supply of power is transferred back from the inverter to the main power source, the microprocessor adjusts the frequency of the output voltage from the inverter to match the input voltage frequency frm the phase locked loop 105, and corrects the phase of the voltage to match the phase of the input voltage compensated by the value of phase difference determined from the look-up table in ROM 114 or calculated by formula at the presently existing level of output current supplied from the inverter to the load.

Figure 4:
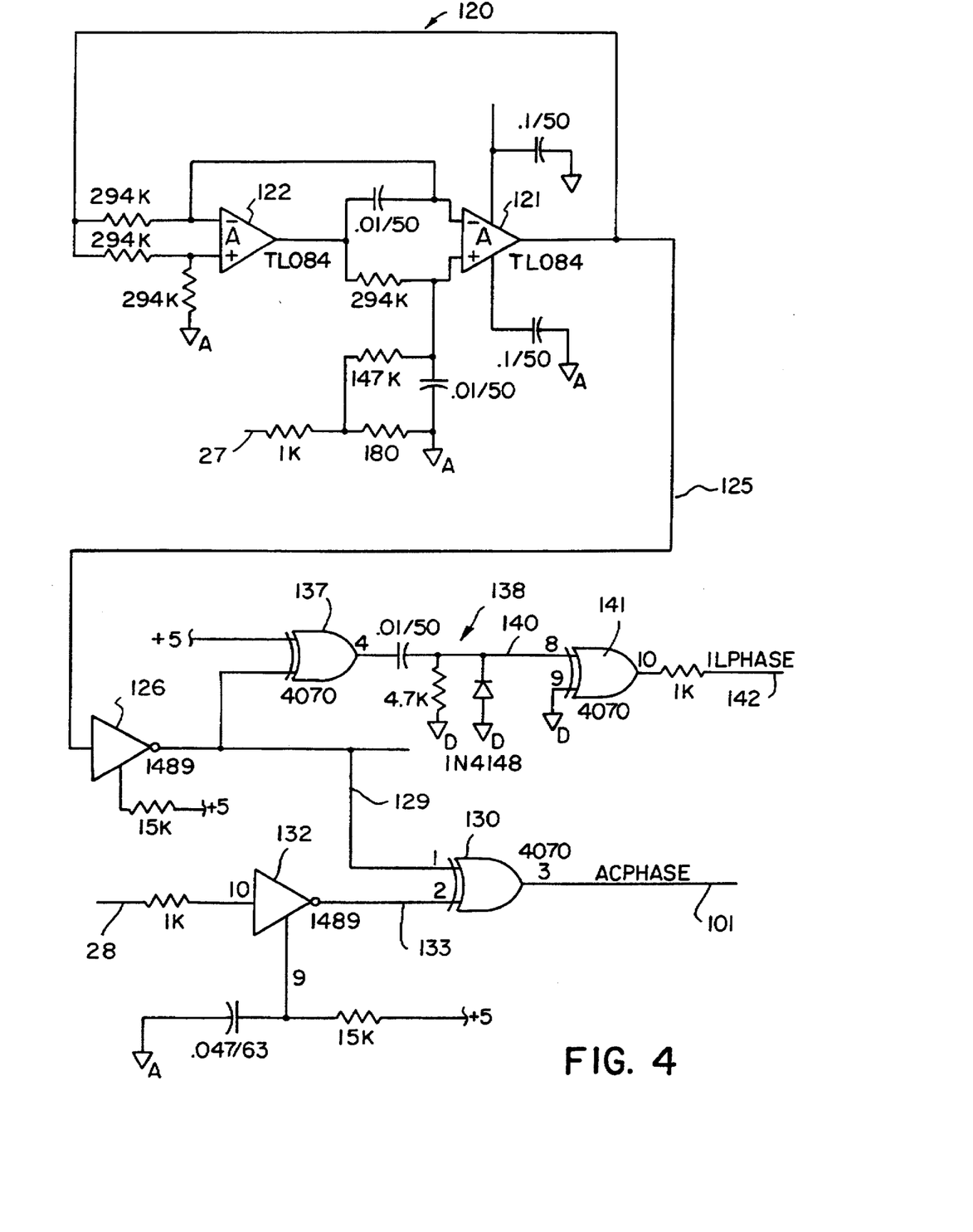
FIG. 4 is a schematic circuit diagram of a phase detection circuit for the controller of FIG. 3.

An exemplary phase detection circuit 100 is shown in FIG. 4. The voltage on one of the lines 27 from the input terminals, referenced to the other line 27 (not shown in FIG. 4) at ground, is provided to a band-pass filter 120 consisting of operational amplifiers 121 and 122, with appropriate biasing elements to configure the operational amplifiers as overlapping high-pass and low-pass filters to pass a signal to the output of the band-pass filter 120 on a line 125 which has a pass band centered about, e.g., 60 Hz. The band-pass filter 120 removes unwanted low frequency and high frequency components from the voltage signal on the line 27 so that only the fundamental frequency of interest at 60 Hz will be present on the line 125. The appropriately filtered signal on the line 125 is provided to a comparator 126 that acts as a zero crossing detector. The comparator 126 provides a square-wave output signal which has one value when the voltage on the line 125 is above zero, and a second value when the voltage on the line 125 is at or below zero. The output of the zero crossing detector 126 is provided on a line 129 to an exclusive OR gate 130. The output voltage on the line 28, which typically has been passed through filters and thus is generally a clean 60 Hz signal, is supplied to a zero crossing detector 132 which has a two level output signal, one level when the voltage on the line 28 is above zero and the other level when the voltage is at or below zero. The output of the zero crossing detector 132 is provided on a line 133 to the other input of the exclusive OR gate 130. The output of the exclusive OR gate 130 on a line 135 is a series of pulses, each of which starts when one of the outputs of the zero crossing detectors 126 and 132 goes high and ends when the other of the zero crossing detectors 126 and 132 goes high. The width of each pulse on the line 135 is thus directly related to the time difference between the zero crossings of the voltage waveforms at the input terminals and the output terminals, which is directly proportional to the phase difference between these two (nominally 60 Hz) signals. The signal on the line 101 is applied to the microprocessor 102 as described above. The microprocessor may utilize the pulse on the line 101 as an input to a timer within the microprocessor which is used to time the length of the pulse and provide data on the time delay $\Delta\phi$ which can be used within the microprocessor's programming.

The output of the zero crossing detector 126 is also provided to an exclusive OR gate 137, the output of which is provided to a half shot pulse generator 138. The half shot pulse generator 138 includes a series capacitor followed by a paralleled resistor and diode to common which essentially passes the leading edges of the pulses from the exclusive OR gate 137 as spikes on a line 140 to one input of an exclusive OR gate 141. The exclusive OR gate 141 provides a pulse on an output line 142 of a controlled width, which is initiated at the time of occurrence of the zero crossing as determined from the zero crossing detector 126. The signal on the line 142 may also be provided to a timer input of the microprocessor 102, which can use the information to determine the frequency and the start of each cycle or half cycle of the input voltage waveform, and therefore this signal provides a frequency and phase reference for the input voltage waveform. Such a signal is preferably provided where an external phase locked loop circuit 105 is not utilized and the microprocessor 102 itself generates a phase locked loop in software based on the timing pulses on the line 142.

An exemplary program which may be utilized by the microprocessor 102 to determine the phase correction is set forth below. Such a program may be implemented in, for example, a Mitsubishi 37702 microcontroller, utilizing the phase difference pulse on line 101 provided to a timer "B1" within the microcontroller, and utilizing the information on the line 142, indicating the time of the zero crossing of the input voltage, provided to a timer "B2" within the microcontroller. In this exemplary program, the phase adjustment or correction required on transfer from line power to inverter (PhaseAdj—in timer clock ticks) is determined in accordance with the measured phase difference as: a phase adjust offset base value (PABase in timer ticks) which is empirically determined for a particular UPS topology (e.g., 1.3 ms for one model of ferroresonant UPS), minus the measured phase difference Δφ (IOPhase in timer ticks). When transferring from inverter back to line power, the IOPhase last determined before line power was lost is used to correct the phase of the power from the inverter prior to transfer. A formula fitting empirical data or correction data stored in memory could also be used to provide a more precise correction adjustment if desired. Generally, the voltage of the battery (or of each battery in a string of batteries) can be measured and used to calculate the correction. An exemplary correction formula for a particular UPS unit is:

$$PhaseAdj = Const2 \left[ 1 - 0.562 \frac{(HBV - DCV)}{(HBV - LBV)} \right]$$

where Const2 is an emperically determined constant (e.g., 2.44 ms),

HBV=high battery voltage (typically 15.3 volts per battery),

LBV=low battery voltage (typically 10.5 volts per battery),

DCV=present measured DC battery voltage per battery. The exemplary program set forth below includes comments illustrating the functions of the components of the program.

| Constants | | |
|---|---|---|
| PABase 60: | .EQU 3560 | ;Phase adjust base - 60 Hz |
| PABase 50: | .EQU 5000 | ;Phase adjust base - 50 Hz |

| Variables | | |
|---|---|---|
| PABase: | .BLKW 1 | ;Phase adjust offset base value |
| Phase: | .BLKW 1 | ;Inverter/line phase, unadjusted |
| AdjPhase: | .BLKW 1 | ;Inverter/line phase + PhaseAdj |
| AbsPhase: | .BLKW 1 | ;Absolute magnitude of phase difference |
| PhaseAdj: | .BLKW 1 | |

-continued

| | | |
|---|---|---|
| IOPhase: | .BLKW 1 | ;Amount to add/subtract from true phase |
| IOPhaseSum: | .BLKD 1 | ;Input/out phase ;Smoothing accumulator, in/out phase |

| | |
|---|---|
| Subroutine: | CalcPhase |
| Function: | Calculate PLL phase adjust (amount to phase-shift the inverter) based on a fixed constant or measured I/O phase. PhaseAdj = PABase − IOPhase (measured) |
| Destroyed: | A, B, MF |

| .DP Direct Page | | |
|---|---|---|
| CalcPhase: | CLM | ;Data = 16 bits |
| | BBS.W #40h,DP:XferCtrl,CalcPhaseX | |
| | ;Don't adjust if softstarting | |
| | PhaseAdj = LinePeriod/2 + PABase − IOPhase | |
| | LDA A,DP:LinePeriod | ;A ← Line period |
| | LSR A | ;/2 for halfcycle period |
| | ADC A,DT:PABase | ;Add phase offset for automatic mode |
| | SBC A,DP:IOPhase | ;Subtract measured phase |
| | STA A,DP:PhaseAdj | ;Save as phase adjust |
| CalcPhaseX: | RTS | ;Exit |
| ;ISR | ILPhaseInt | |
| ;Source: | Timer B2, Pulse period measurement mode | |
| ;Priority: | 5 | |
| ;Function Compute inverter/line phase | | |

| .DP DirectPage | | |
|---|---|---|
| ILPhaseInt: | CLP M,X,D,I | ;Data, index = 16 bits |
| | PSH A,X,DBR,DPR | ;Save registers |
| | LDT #0 | ;Use data bank 0 |
| | LDA.WA, | ;Point to global direct page |
| | *#DirectPage | area |
| | TAD | ; |
| | Get captured phase, add in overflow (if any) | |
| | SEM | ;Data = 8 bits |
| | LDM.B#0,DT: | ;Disable interrupt until inverter |
| | ILP_TICR | ZC |
| | CLM | ;Data = 16 bits |
| | LDA A,DT: | ;Get captured phase |
| | ILP_Timer | |
| | ASL A | ;*4; equalize line period & phase units |
| | ASL A | ; |
| | Since the phase measurement from the timer is referenced from the "inverter zero cross", substract it from <LinePeriod> to reference it to the line zero cross. | |
| ILPInt2: | STA A,DP:Phase | ;Save inverter-referenced phase |
| | LDA A,DP:LinePeriod | ;Get line period |
| | SEC | ;Subtract inverter-ref'd phase from... |
| | SBC A,DP:Phase | ;...line period to get line-ref'd phase |
| | BCS ILPInt3 | ;Continue if no underflow |
| | LDA.W A,#0 | ;Underflow, force to 0 |
| ILPInt3: | STA A,DP:Phase | ;Save actual phase |
| | Subtract programmable <PhaseAdj> from actual phase to create the phase parameter to be used by the PLL | |
| | SEC | ; |
| | SBC A,DP:PhaseAjd | ;Subtract phase shift adjustment |
| | BCC ILPInt4 | ;If underflow, add line period to fix |
| | CMP A,DP:LinePeriod | ;Adjusted I/L Phase > line period? |
| | BLT ILPInt5 | ;No, phase is OK |
| ILPInt4: | CLC | ;Yes, add line period to fix |
| | ADC A,DP:LinePeriod | ; |
| ILPInt5: | STA A,DP:AdjPhase | ;Save adjusted phase |
| | Calculate "absolute" phase difference (distance from phase lock) | |
| | TAX | ;X ← Adjusted phase |
| | LDA A,DP:LinePeriod | ;Get line period |
| | LSR A | ;/2 for sign check |
| | CMP A,DP:AdjPhase | ;(LinePeriod/2) => Phase? |
| | BGE ILPInt6 | ;Yes, don't negate phase |
| | LDA A,DP:LinePeriod | ;Calculate "inverted" phase |

-continued

```
            SEC              ; (Lineperiod – AdjPhase)
            SBC A,DP:AdjPhase ;
            TAX              ;X ← Absolute phase difference
ILPInt6:    STX DP:AbsPhase  ;Save
            Determine if phase is locked
            LDA A,DT:Phase Win ;A ← "Wide" phase window
            CMP A,DP:AbsPhase  ;Wide window < Phase?
            BLT ILPInt8       ; Yes, phase in not locked
            LSR A            ;A ← "Narrow" phase window
                             (wide/2)
            CMP A,DP:ABSPhase ;Narrow window < Phase?
            BLT ILPInt7      ;Yes, do not change slew rate
            LDA A,DT;SlewRate ;Phase < Narrow window, use
                             slew/2
            LSR A            ;
ILPInt7:    SEB.W #80h,DP:   ;Phase is locked
            LineStat
            BRA ILPInt9      ;Set slew rate & exit
ILPInt8:    CLB.W #80h,DP:   ;Phase is not locked
            LineState
            LDA A,DT:SlewRate ;Phase > Wide window, use full
                             slew rate
ILPInt9:    STA A,DP:Slew    ;
            Exit
ILPIntX:    CLM              ;Data = 16 bits
            PUL A,X,DBR,DPR  ;Restore registers
            RTI              ;Exit
;ISR:       ACPhaseInt
;Source:    Timer B1, Pulse Period measurement mode
;Priority:  4
;Function:  Compute input/output phase

.DP OFF

ACPhaseInt: CLP M,X,D,I,C    ;Data, index = 16 bits
            PSH A,B,X,DBR    ;Save registers
            LDT #0           ;Use data bank 0
            SEM              ;Data = 8 bits
            BBS.B #20h,DT:   ;Exit if capture
            ACP"_TMode,
            ACP1 overflow
            BBS.B #01h,DT:   ;Ignore phase if on
            XferCtrl,ACP1
            inverter
            BBS.B #02H,DT:   ;Ignore phase if
            LineStat,ACP1
            brownout
            CLM              ;Data = 16 bits
            LDA A,DT:        ;No overflow, get
            ACP_Timer        captured value
            CMP.W A,#40h     ;Below minimum?
            BLT ACP2         ; Yes, reject
            CMP.W A,#400h    ;Above maximum?
            BGE ACP2         ; Yes, reject
            LDA.W B,#64      ;Smooth over 64 samples
            LDX.W #10PhaseSum ;Point to summing
                             accumulator
            JSR Smooth       ;Calc. average of 64
                             phase measurements
            LSR A            ;/4 for f/8 units
            LSR A            ;
            STA A,DT:IOPhase ;Save result
ACP1:       CLM              ;Data = 16 bits
            CLB.W #20h,DT:   ;Clear overflow status
            ACP_TMode
ACP2:       PUL A,B,X,DBR    ;Restore registers
            RTI              ;Exit
```

It is also possible to calculate an approximate difference based upon metered parameters that affect input-output phase such as output load and DC volts. This approach has the advtange of being fully implemented by software in the microprocessor 102 if the metering hardware is available. Its disadvantage is it uses constants that vary somewhat depending upon manufacturing variations of the transformer 56. An exemplary program for determining the phase correction in this manner is set forth below.

```
            HBV2 = 60.0 volts for 48 volt systems
            HBV2 = 15.3 volts for 12 volt systems
            LIPDLY = 1536 for 50 Hz systems
            ILPDLY = 3000 for 50 Hz systems
            LIPDLY = 1280 for 60 Hz systems
            ILPDLY = 3000 for 60 Hz systems
;********************************************************
;Subroutine:   CALCPD
;Function:     Calc. phase delays LIPMax (init. phase for line-inverter
;              xfers) and ILPMax (initial phase
;              for inverter-line transfers).
;              Called 1/second by REF120
;              LIPMax = (Line-Inverter phase delay) * (% Full
;              Load)^2
;              where: (Line-Inverter phase delay) = parameter 65 =
;              lipdly (% Full Load) = parameter 16 = pfl
;              ILPMax = (Inverter-line phase delay) – (HBV2-DCV)*
;              ILPMul
;              where: (Inverter-Line phase delay) = parameter 63 =
;              ilpdly
;              DCV = DC Volts
;              HBV2 = High batt voltage (use greater of HBV1, HBV2
;              ILPCal = inverter-line phase multiplier based on low/
;              high DCV setpoints; computed in PWCOMP.
;Destroyed:    Everything
;********************************************************
;       Calculate load dependent line-inverter phase delay
CALCPD:  mov    a,pfl           ;A ← Percent full load
         mul    a               ;EA ← (% Full Load)^2 * 10000
         dmov   b,ea            ;Save to BC
         lded   lipdly          ;DE ← Line-Inverter phase delay (hex)
         call   mul16           ;[EA,HL] ← (LIP Delay)*(% Full
                                Load)^2 * 10000
         lxi    d,1,0000        ;DE ← 10000
         call   div32           ;[EA,HL] ← (LIP Delay)* (% Full
                                Load)^2
;       Add scaled phase delay to minimum allowed
         lxi    ea,pdmin        ;EA ← Min phase delay
         dadd   ea,h            ;Add line-inverter phase delay to
                                minimum delay
         dmov   h,ea            ;
         shld   lipmax          ;Save max (initial) line-inverter phase
                                delay
;       Calculate battery voltage dependent inverter-line phase delay
         lded   dcv             ;DE ← DC Volts (BCD)
         mov    a,d             ;A ← MSB of DCV
         call   bcd2hx          ;Convert MSB
         mov    a,e             ;A ← LSB of DCV
         call   nx2hx           ;Convert LSB
         dmov   ea,h            ;BC ← DC Volts (HEX)
         dmov   b,ea            ;
         lded   hbv2            ;DE ← High Battery setpoint (BCD)
         mov    a,d             ;A ← MSB of HBV2
         call   bcd2hx          ;Convert MSB
         mov    a,e             ;A ← LSB of HBV2
         call   nx2hx           ;Convert LSB
         dmov   ea,h            ;EA ← High battery setpoint (HEX)
         dsubnb ea,b            ;EA ← High battery setpoint – DC
                                Volts
         lxi    ea,0            ;Ensure "0" result if DCV > HBV2
         dmov   b,ea            ;BE ← Result
         lded   ilpmul          ;DE ← Scaler
         call   mul16           ;[EA,HL] ← (HBV2-DCV)*ILPMul
         lded   ilpdly          ;EA ← Inverter-line phase delay
                                (hex)
         dmov   ea,d            ;
         dsub   ea,h            ;EA ← I-L delay-(HBV2*DCV)*
                                ILPMul
         lxi    h,ilpmin        ;HL ← Minimum I-L delay
         dgt    ea,h            ; Computed value > minimum?
         dmov   ea,h            ; No, force to minimum
         lxi    h,pdmin         ;HL ← Min phase delay
         dadd   ea,h            ;Add inverter-line phase delay to
                                minimum delay
         dmov   h,ea            ;
         shld   ilpmax          ;Save initial inverter-line phase delay
         ret                    ;Exit
;********************************************************
;Subroutine:   PWCOMP
;Function:     Computes various things at startup or when a param is
```

-continued

```
                    prog'd
;Destroyed:     A,BC,DE,HL,EA
;************************************************
;    Compute scaling factor used in ILPMAX calculation (see CalcPD)
;    ILPMul = ILPDly/[2*(HVB2-LBV)]
        lded    lbv          ;DE ← Low Battery Setpoint (BCD)
        mov     a,d          ;A ← MSB of LBV
        call    bcd2hx       ;Convert MSB
        mov     a,e          ;A ← LSB of LBV
        call    nx2hx        ;Convert LSB
        dmov    ea,h         ;BC ← Low Battery Setpoint (HEX)
        dmov    b,ea         ;
        lded    hbv2         ;DE ← High Battery Setpoint (BCD)
        mov     a,d          ;A ← MSB of HBV2
        call    bcd2hx       ;Convert MSB
        mov     a,e          ;A ← LSB of HBV2
        call    nx2hx        ;Convert LSB
        dmov    ea,h         ;EA ← High battery setpoint (HEX)
        dsubnb  ea,b         ;EA ← High battery setpoint-Low
                              Batt Setpoint
        lxi     ea,0         ;Ensure "0" result if LBV > HBV2
        dsll    ea           ;EA ← 2*(HBV2-LBV)
        dmov    d,ea         ;DE ← Result for subsequent divide
        lhld    ilpdly       ;HL ← Inv-Line phase delay
        dmov    ea,h         ;EA ← 0.125 * ILPDLY
        dslr    ea           ;
        dslr    ea           ;
        dslr    ea           ;
        dadd    ea,h         ;HL ← 1.125 * ILPDLY
        dmov    h,ea         ;
        lxi     ea,0         ;
        call    div32        ;[EA,HL] ← ILPMul
        shld    ilpmul       ;Store result (used in CalcPD)
```

Although the implementation of the invention has been described above with respect to a UPS employing a ferroresonant transformer, it is apparent that the invention can be applied to any other type of UPS having a main power path which normally supplies power from the main power source to the load, and where the main power path will cause a shift in the phase of the output voltage as compared to the input voltage.

It is understood that the invention is not confined to the particular embodiments set forth herein as illustrative, but embraces all such modified forms thereof as come within the scope of the following claims.

What is claimed is:

1. An improved uninterruptible power system of the type having input terminals connectable to an AC power source, output terminals connectable to a load, a main power path between the input and output terminals, a power transfer device in the main power path which affects the phase of the voltage at the output terminals as compared to the phase of the voltage at the input terminals, an auxiliary power source, an inverter connected to the auxiliary power source to provide power when needed to the output terminals, a controllable switch in the main power path to selectively isolate the input terminals from the output terminals, and a controller which determines when a fault has occurred in the power supplied from the AC power source and, in response, opens the switch to isolate the input and the output terminals and turns on and controls the inverter to supply AC power to the output terminals at a selected frequency and phase, the improvement comprising:

means in the controller for monitoring the voltages at the input and output terminals during normal supply of power in the main power path from the input terminals to the output terminals and determining the phase difference between the voltages at the input and output terminals, and upon a fault condition for opening the switch and turning on the inverter, and for controlling the inverter to provide output voltage therefrom to the output terminals at a frequency determined from the voltage at the input terminals prior to the fault condition and at a phase which is the phase of the voltage at the input terminals prior to the fault corrected in accordance with the phase difference between the voltages at the input and output terminals prior to the fault.

2. The uninterruptable power system of claim 1 wherein the power transfer device is a ferroresonant transformer.

3. The uninterruptable power system of claim 1 including a phase locked loop coupled to the input terminals to track the frequency and phase of the voltage at the input terminals.

4. The uninterruptable power system of claim 1 wherein the control means further monitors the voltage at the input terminals when the inverter is supplying power to the output terminals, determines when the power is restored from the AC power source to the input terminals, and measures the frequency and phase of the voltage at the input terminals and controls the operation of the inverter to cause the inverter to provide voltage at the output terminals at a frequency matched to the frequency of the voltage at the input terminals and at a phase which is the phase of the input voltage corrected in accordance with a selected phase difference.

5. The uninterruptable power system of claim 4 wherein the controller determines the selected phase difference as the last phase difference between the voltages at the input and output terminals before occurrence of the fault in the power provided to the input terminals by the AC power source.

6. The uninterruptable power system of claim 4 further comprising means for measuring the output current provided by the inverter to the load and a memory in which is stored data relating a preferred corrected phase difference value between the input and output terminal voltages at different levels of output current drawn by the load, wherein the controller utilizes the measured value of output current to retrieve from the memory the appropriate value of corrected phase difference for that level of output current, wherein the controller utilizes the value of the phase difference retrieved from the memory to adjust the phase of the voltage provided by the inverter, and then turns the inverter off and closes the switch in the main power path to provide power through the main power path from the input terminals to the output terminals.

7. The uninterruptable power system of claim 4 wherein the control of the inverter and the determination of the corrected phase difference is carried out in a microprocessor controller.

8. The uninterruptable power system of claim 1 wherein the means for determining the phase difference between the voltages at the input and output terminals includes a bandpass filter receiving the voltage across the input terminals and providing an output voltage which is filtered to pass frequencies centered at the nominal frequency of the input voltage, a zero crossing detector receiving the filtered input voltage and providing a two level output waveform which changes at the zero crossings of the filtered output voltage, a zero crossing detector receiving the output voltage at the output terminals and providing a two level output waveform which changes state at the zero crossings of the output voltage, and a gate for receiving the outputs of the input zero crossing detector and the output zero crossing detector and providing a pulse output which is proportional to the difference in the time between the zero crossings of the input and output voltage waveforms.

9. A method of transferring the supply of power in an uninterruptible power system having input terminals connected to an AC power source, output terminals connected to a load, and a main power path between the input and output terminals with a power transfer device in the main power path which affects the phase of the voltage at the output terminals as compared to the phase of the voltage at the input terminals, comprising the steps of:

(a) monitoring the voltage applied to the input terminals by an AC power source and determining when a fault in the power from the AC power source occurs;

(b) monitoring the AC voltage applied to the input terminals by the AC power source and the voltage at the output terminals when AC power is provided by the AC power source to the input terminals, determining the phase difference between the voltages at the input and output terminals, and determining the frequency and phase of the voltage at the input terminals prior to a fault; and (c) upon occurrence of a fault in the power applied to the input terminals by the AC power source, opening a switch in the main power path to interrupt the supply of power between the input and output terminals and providing AC power from an auxiliary power source to the output terminals at the same frequency as the voltage applied to the input terminals before the fault and at a phase which is the phase of the input voltage before the fault corrected in accordance with the phase difference between the voltages at the input and output terminals before the fault.

10. The method of claim 9 including the further steps of:

monitoring the voltage at the input terminals while the main power path is interrupted and power is supplied to the output terminals by the auxiliary power source and determining when power is restored to the input terminals from the main AC power source;

then measuring the frequency and phase of the voltage at the input terminals when the power is restored from the main AC power source;

then changing the frequency of the voltage applied to the output terminals from the auxiliary power source to match the frequency of the voltage at the input terminals and at a phase which is the phase of the voltage at the input terminals corrected in accordance with a selected phase difference;

then ceasing supply of power to the output terminals from the auxiliary power source and completing a power transfer path through the main power path from the input terminals to the output terminals to resume supply of power from the main AC power source to the load.

11. The method of claim 10 wherein the selected phase difference is the last phase difference determined between the voltages at the input and output terminals before occurrence of the fault in the power provided to the input terminals from the AC power source.

12. The method of claim 10 including the further steps of measuring the current provided by the auxiliary power source to the load, providing a memory in which data is stored relating a preferred corrected phase difference between the input and output terminal voltages to different levels of output current drawn by the load, using the measured current provided to the load to determine from the memory the preferred corrected phase difference between the input and output voltages at that level of current, and using the corrected phase difference so determined as the selected phase difference by which the phase of the voltage provided by the auxiliary power source to the load is corrected before discontinuing supply of power from the auxiliary power source and resupplying power through the main power path from the main AC power source to the load.

* * * * *